United States Patent [19]
Westphal

[11] 3,736,540
[45] May 29, 1973

[54] MOUNTING OF AN ARMATURE PLATE IN A THERMOELECTRIC PILOT SAFETY DEVICE

[75] Inventor: Dieter Westphal, Huckeswagen, Germany

[73] Assignee: Voh. Vaillant KB, Remscheid, Germany

[22] Filed: Mar. 31, 1971

[21] Appl. No.: 115,680

[30] Foreign Application Priority Data
Apr. 2, 1970 Austria..................................A/3026

[52] U.S. Cl..................................335/279, 137/66
[51] Int. Cl................................................H01f 7/08
[58] Field of Search......................335/255, 257, 260, 335/277, 279; 137/66; 251/129

[56] References Cited
UNITED STATES PATENTS 2,296,322 9/1942 Alfery.....................................137/66
3,042,842 7/1962 Cox...................................335/260 X Primary Examiner—George Harris
Attorney—Howard H. Darbo et al.

[57] ABSTRACT

A thermoelectric pilot safety apparatus includes an electromagnet and a plate shaped armature having one face adjacent the electromagnet. Extending in the direction away from the other face is a stem which connects to a valve closure. A disk is secured to the plate end of the stem. A ring connects the plate and the disk. In one embodiment the disk and ring are integral and formed of a thermoplastic with the edge of the ring at the one face turned over the plate by hot working after assembly. In another embodiment the ring is thermoplastic and it is the edge at the disc that is turned over into engagement by hot working. The stem may be integral with the disk or be of a thermoplastic material which is beaded out by hot working to provide the connection between the two.

9 Claims, 5 Drawing Figures

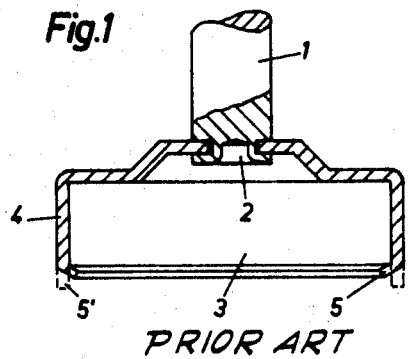
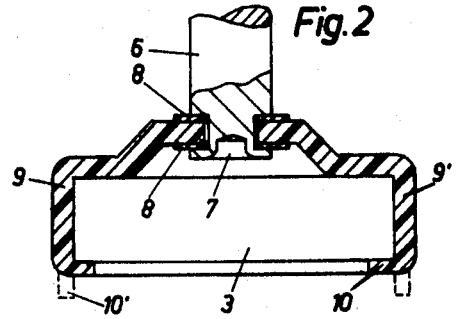
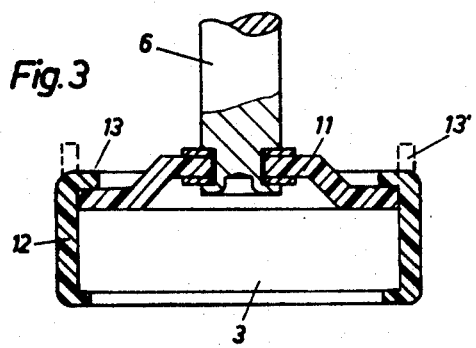
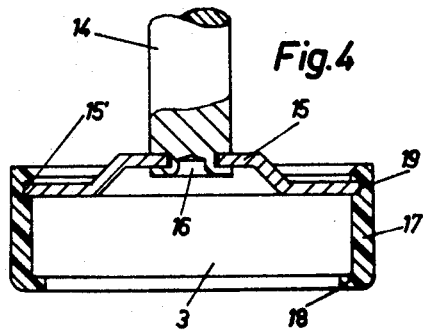
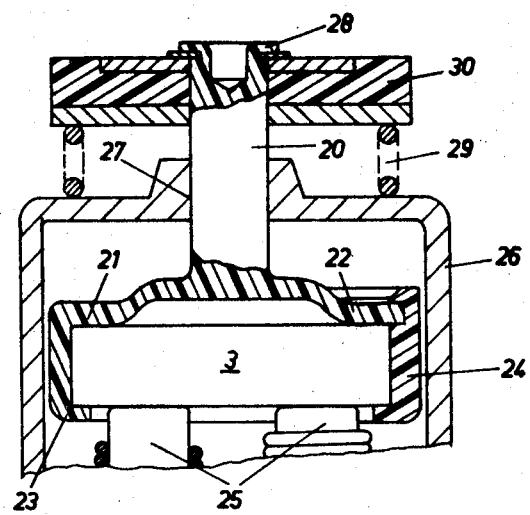

MOUNTING OF AN ARMATURE PLATE IN A THERMOELECTRIC PILOT SAFETY DEVICE

BACKGROUND AND SUMMARY OF THE INVENTION

This invention relates to the mounting of an armature plate of a thermoelectric pilot safety device on a stem and includes a disk which is secured to the stem, and a ring which engages both the disk and the plate.

It is prior art to insert the stem in a central bore in the armature plate and then bead or rivet the end of the stem extended through the bore to connect the two (German Patent application R 12 286 XII/47g and German Federal Pat. No. 1,240,784). Such a connection between the valve stem and the armature plate may be undesirable due to the unfavorable influence on the magnetic field (Swiss Pat. No. 400,057, page 1, lines 6 to 18). Moreover, by this connection there exists the danger that mechanical stress is applied to the armature plate, whereby the carefully worked (for example as by lapping) surface of the armature plate, which surface is to abut the magnets, loses its flatness so that the holding force created by the magnet is not fully utilizable.

As can also be gathered from the Swiss Pat. No. 400,057, a connection is prior art (page 1, column 1, from line 19 onward) in which the stem is connected with the armature plate by means of a metallic disk gripping around the rim of the armature plate, the disk being supported over an extended area on the side of the armature plate facing the stem, so that the connection is rigid and accordingly provides a relatively hard impact of the armature plate against the magnet. It has shown in practice that when using a metallic mounting gripping around the armature plate, such as a disk of the aforesaid type, the impact of the armature plate against the magnet causes abrasion between the disk and the armature plate, whereby minute metallic particles are released. These frequently deposit between the armature plate and the magnet and prevent the required intimate engagement of the two parts, thereby causing trouble. This is also the case when using the spring plate disclosed in the Swiss Pat. No. 400,057.

The grip (beading) of the armature plate moreover involves the danger that the armature plate when assembled is subjected to mechanical stress whereby its plane bearing surface is deformed. This is detrimental to the holding force of the magnet.

It is an object of this invention to mount an armature plate in a thermoelectric pilot safety device to a stem in such a manner that the magnetic field of the pilot safety magnet is not disturbed by the mounting and it is ensured that the armature plate can bear against the magnet tightly and planely.

According to the invention this object is attained in that the holding members are provided by an annular piece of thermoplastic having a rim which is folded inwardly, as by hot working, to obtain the required engagement.

When the mounting is formed in such a manner, the magnetic field and the distribution of the lines of force are not disturbed as the armature plate is not deformed but is a flat solid member and presents a smooth and plane surface to the magnet. The annular piece of thermoplastic does not cause any abrasion. Also, there are no stress on, and deformation of, the armature plate in the hot working of the annular piece, quite in contrast to a beading.

The invention may be realized in different forms. For instance, in such a manner that the disk together with the annular piece provides a single cup-shaped piece of thermoplastic. Another possibility resides in the fact that the disk is a plastic or metallic disk having its rim engaging in a groove on the internal side of the ring in the vicinity of the rim thereof. Finally, the mounting of the armature plate may be accomplished in that the disk is a plastic or metallic disk, and that the annular piece with its rim on the side of the stem is folded over the rim of the disk as by hot working.

The stem may also be of thermoplastic. In such a case it is of particular advantage if stem, disk and annular piece constitute one single molded body of thermoplastic.

A certain elasticity and the avoidance of shocks when the armature plate is caused to engage will be achieved if the disk has its rim portions flatly supported on the armature plate and its central area extended upwardly on the side of the stem. Then, the stem may also have a projecting stem passing through a hole in the disk and connected with the disk as by hot working of this stem into a bead.

DESCRIPTION OF THE DRAWINGS

FIG. 1 illustrates an assembly according to the prior art for comparison purposes.

FIG. 2 illustrates one embodiment of the invention in which a disk against which the armature plate supports and a ring constitute a single molded body of thermoplastics, the rim of the ring being folded around the armature plate.

FIG. 3 illustrates another embodiment of the invention in which a plastic disk and an armature plate are gripped by a thermoplastic ring and are held together by hot working of the rim of this ring.

FIG. 4 illustrates a still further embodiment in which a plastic stem is connected with a metallic disk with a plastic ring engaging the disk and armature plate.

FIG. 5 in the left portion illustrates an assembly in which the stem, the disk and the annular piece are provided by a single coherent molded part of plastic, and in the right portion a molded part of the stem and the disk.

PRIOR ART

In the embodiment according to FIG. 1, which is prior art and suffers from the shortcomings referred to, reference numeral 1 is a metallic stem. At the end of the stem, not shown here, the valve closure of a gas safety valve is mounted. At the other end 2 of the stem is secured a cup-shaped sheet metal piece 4. The cup 4 receives and grips an armature plate 3. For positional retainment of the armature plate 3, the rim 5' of the sheet metal piece 4 is mechanically folded as at 5.

DESCRIPTION OF SPECIFIC EMBODIMENTS OF THE INVENTION

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

Referring to FIG. 2, a cup-shaped plastic body 9 is secured to a metallic stem 6 by beading the stem end 7 and adding two metallic disks 8. After insertion of the armature plate 3 the edge 10' of the ring portion 9' is folded as by hot working to form a rim or flange 10. The thermoplastic could, for example, be nylon although there are many available. It is hot worked by heating it to a point at which it will flow or permanently deform and then applying a suitable amount of force to relocate it into the form of a rim.

The same connection of the metallic stem 6 and a plastic disk 11 is shown in FIG. 3. After insertion of the armature plate 3 in the plastic ring 12, the two are placed together on the disk 11, and the rim 13', projecting to the rear of the disk, is hot worked and folded inwardly to form a rim 13 engaging the disk 11.

In FIG. 4 a relatively elastic stem 14 of plastic is connected to a plane disk 15 of metal. The stem is formed with a stud of smaller cross-section which is inserted through an opening in disk 15 and then hot worked to form a bead or flange 16. In this embodiment, the armature plate 3 is placed in a plastic ring 17 as far as engagement of the armature plate 3 with the rim 18 of the ring 17; whereupon the elastic ring is slipped over disk 15 until the disk seats in an internal groove 19 and the ring engages the rim 15' of the disk 15. The stem 14 made of relatively elastic plastic attenuates the hard impact of the armature plate against the magnet. The attachment of the armature plate to the disk may also be accomplished herein in the manner disclosed in FIG. 3.

In FIG. 5, the stem 20 together with a cup-shaped body 21 or a disk 22 is made from one piece of plastic. In the embodied form illustrated in the left portion of this Figure the body 21 grips around the armature plate 3 in a cup-shaped manner and its lower edge is hot worked to form a rim 23 engaging the plate. In the embodiment shown in the right portion of the same Figure, the disk 22 seats in a groove in ring 24 in the manner of FIG. 4.

The stem 20 extends through a housing 26 which surrounds the magnet 25, as at 27. At its other end 28 the stem is deformed by heat into a bead to engage a valve closure 30. A spring 29, of the gas safety valve of the thermoelectric burner safety device urges the closure away from housing 26 and toward the valve seat (not shown). The magnets 25 have electrical windings which are energized by a thermocouple (not shown) when the latter is heated by a pilot flame. When the flame heating the thermocouple is extinguished, the magnet 25 loses its holding force and releases the armature plate 3. The spring 29 then forces the valve closure 30 against its seat.

I claim:

1. In a thermoelectric pilot safety apparatus including a valve closure, an electromagnet, an armature plate for said electromagnet, a disk part on the other side of the plate from the electromagnet, a stem part connecting the disk part and the closure, and a ring part having one edge engaging the disk part and the other edge engaging the plate, the improvement comprising:
   one part being a thermoplastic which after assembly with the other parts and the plate has one projection thereof folded to form an integral flange to provide said engagement with the connecting part.

2. In an apparatus as set forth in claim 1, wherein said one part is said ring part and said one projection is one edge of the ring part.

3. In an apparatus as set forth in claim 2, wherein said disk part and the ring part are integral and said one edge is the edge in engagement with the plate.

4. In an apparatus as set forth in claim 3, wherein the ring part has an internal groove adjacent the other edge thereof and said disk is seated in said groove.

5. In an apparatus as set forth in claim 2, wherein said one edge is the edge engaging the disk.

6. In an apparatus as set forth in claim 1, wherein said one part is said stem part.

7. In an apparatus as set forth in claim 2, wherein said stem part, said disk part and said ring part is a unitary piece of thermoplastic material.

8. In an apparatus as set forth in claim 1, wherein said disk part has the peripheral area thereof positioned in a common plane and in contact with said plate, and has the central area thereof concave on the side adjacent the plate.

9. In an apparatus as set forth in claim 8, wherein said stem is formed of thermoplastic material and defines a stud of reduced cross-section which projects through said central area and is beaded outwardly to engage said disk part.

* * * * *